(12) United States Patent
Breyer et al.

(10) Patent No.: US 9,109,074 B2
(45) Date of Patent: Aug. 18, 2015

(54) BONDING WOOD COMPOSITES WITH A CALCIUM-MODIFIED PHENOL-FORMALDEHYDE RESIN

(75) Inventors: Robert A. Breyer, Tucker, GA (US);
Paul S. Baxter, Conyers, GA (US);
James H. Knight, Conyers, GA (US);
John D. Cothran, Conyers, GA (US);
Robert M. Meacham, Conyers, GA (US); Jessica D. Jennings, Social Circle, GA (US); Herman D. Watts, Jr., McDonough, GA (US); Derek L. Atkinson, Lawrenceville, GA (US);
Daniel C. Yeager, Smyrna, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 652 days.

(21) Appl. No.: 12/724,911

(22) Filed: Mar. 16, 2010

(65) Prior Publication Data

US 2010/0273917 A1    Oct. 28, 2010

Related U.S. Application Data

(60) Provisional application No. 61/171,895, filed on Apr. 23, 2009.

(51) Int. Cl.
*C08L 97/02* (2006.01)
*C08G 8/10* (2006.01)
*C09J 161/06* (2006.01)
*C08L 61/06* (2006.01)

(52) U.S. Cl.
CPC . *C08G 8/10* (2013.01); *C08L 97/02* (2013.01); *C09J 161/06* (2013.01); *C08L 61/06* (2013.01)

(58) Field of Classification Search
CPC ........... C08L 61/06; C09J 161/06; C08G 8/10
USPC ............................. 524/14, 843, 844; 528/140
See application file for complete search history.

(56) References Cited

U.S. PATENT DOCUMENTS

| | | | | |
|---|---|---|---|---|
| 4,157,324 A * | 6/1979 | Culbertson | .................... | 524/361 |
| 4,195,019 A * | 3/1980 | Babina et al. | ................. | 524/702 |
| 4,663,418 A * | 5/1987 | Jellinek et al. | ................ | 528/140 |
| 4,824,896 A * | 4/1989 | Clarke et al. | ................... | 524/405 |
| 4,904,516 A * | 2/1990 | Creamer | ........................ | 528/129 |
| 5,051,454 A * | 9/1991 | Lemon et al. | ................. | 523/146 |
| 5,057,591 A * | 10/1991 | Detlefsen et al. | .............. | 528/140 |
| 5,173,527 A * | 12/1992 | Calve | .............................. | 524/74 |
| 5,202,403 A * | 4/1993 | Doering | ........................ | 527/403 |
| 5,290,843 A * | 3/1994 | McDonald et al. | .............. | 524/405 |
| 5,461,108 A * | 10/1995 | Lewis, deceased | ........... | 524/596 |
| 6,090,883 A * | 7/2000 | Fouquay et al. | ............... | 524/594 |
| 6,245,882 B1 * | 6/2001 | Matilainen et al. | ........... | 528/489 |
| 6,608,162 B1 * | 8/2003 | Chiu et al. | ...................... | 528/129 |
| 8,569,430 B2 * | 10/2013 | Knight et al. | ................... | 525/480 |
| 2002/0004554 A1 * | 1/2002 | Tang et al. | ...................... | 524/843 |
| 2002/0016441 A1 * | 2/2002 | Sameshima et al. | ........... | 528/373 |

(Continued)

*Primary Examiner* — Michael Pepitone
*Assistant Examiner* — Michael A Salvitti
(74) *Attorney, Agent, or Firm* — Ram W. Sabnis

(57) ABSTRACT

The present invention relates to an aqueous phenol-formaldehyde resole resin prepared by reacting phenol and formaldehyde in the presence of a source of calcium ions, to a curable powdered (particulate) resole resin made by spray drying the aqueous phenol-formaldehyde resole resin, to a method of preparing a wood composite using the curable, powdered resin, and the related wood composite bonded with the curable, powdered resin.

20 Claims, 4 Drawing Sheets

Press Time Series Results
BIB by Resin and Press Time

(56) References Cited

U.S. PATENT DOCUMENTS

| | | | |
|---|---|---|---|
| 2002/0144522 A1* | 10/2002 | Messick et al. | 65/477 |
| 2003/0096922 A1* | 5/2003 | Tutin et al. | 525/480 |
| 2003/0205330 A1* | 11/2003 | Foucht et al. | 156/350 |
| 2007/0010604 A1* | 1/2007 | De Fazio et al. | 524/156 |
| 2007/0112092 A1* | 5/2007 | Rediger et al. | 523/145 |
| 2008/0064284 A1* | 3/2008 | Srinivasan et al. | 442/327 |
| 2008/0064799 A1* | 3/2008 | Srinivasan et al. | 524/155 |
| 2010/0273917 A1* | 10/2010 | Breyer et al. | 524/14 |
| 2011/0262760 A1* | 10/2011 | Breyer et al. | 428/535 |

* cited by examiner

D4 Testing Results

BONDING WOOD COMPOSITES WITH A CALCIUM-MODIFIED PHENOL-FORMALDEHYDE RESIN

CROSS-REFERENCE TO RELATED APPLICATION

This application claims priority to U.S. Application No. 61/171,895, filed Apr. 23, 2009, the entirety of which is herein incorporated by reference.

FIELD OF THE INVENTION

The present invention is directed to an aqueous phenol-formaldehyde resole resin prepared by reacting phenol and formaldehyde in the presence of a source of calcium ions, to a curable powdered (particulate) resole resin made by spray drying the aqueous phenol-formaldehyde resole resin, to a method of preparing a wood composite using the curable, powdered resin, and the related wood composite bonded with the curable, powdered resin.

BACKGROUND OF THE INVENTION

Wood-resin composite products, such as plywood, laminated veneer lumber (LVL), oriented strand lumber (OSL), oriented strand board (OSB), waferboard, particleboard, medium density fiber board, hardboard and the like, traditionally have been made by combining a binder resin with wood components to form a stack or mat which is then consolidated in a hot platen press to cure the binder resin.

In many cases, the binder resin is a phenol-formaldehyde resin and is supplied in the form of a powder. Manufacturing OSB and waferboard are applications where phenol-formaldehyde resin powders, in particular, find a significant level of use. The powdered resins have a number of advantages over liquid resins in such applications, such as: (a) simple and less expensive equipment often can be used for handling and blending the resin with the wood furnish; (b) powdered resins are easy to blend onto wood wafers and strands, usually achieving a more uniform resin distribution; and (c) powdered resins generally have longer storage lives, so inventory control is easier to manage.

Historically, such phenol-formaldehyde resin powders are prepared by spray-drying a liquid phenol-formaldehyde precursor resin made under alkaline conditions (i.e., a resole resin) in the presence of a sodium hydroxide catalyst. Such resins are fast curing and provide wood composites of high strength.

The present invention represents a departure from the conventional approach of using sodium hydroxide as the sole source of alkalinity when synthesizing such powdered resins. In particular, applicants have discovered that a phenol-formaldehyde resin catalyzed solely using sodium hydroxide is not the best choice under all wood composite manufacturing conditions. Depending on manufacturing conditions, wood composites of improved properties can be prepared using a powdered phenol-formaldehyde resole resin that has been prepared in the presence of a source of calcium ions.

SUMMARY OF THE INVENTION

In one embodiment, the present invention is directed to a phenol-formaldehyde resole resin, suitable for making a curable, powdered wood adhesive resin by spray-drying, the resole resin comprising an aqueous, alkaline reaction product of phenol and formaldehyde reacted in the presence of a source of calcium ions, wherein: (A) the phenol-formaldehyde resin is prepared at a cumulative formaldehyde to phenol mole ratio (F:P) in the range of 1.5:1 to 2.6:1, (B) the phenol-formaldehyde resin has a total alkalinity in the range of 1.5 to 8 percent by weight and (C) the phenol-formaldehyde resin is prepared in the presence of an amount of calcium ions sufficient to provide a phenol to calcium mole ratio (P:Ca) in the range of 35:1 to 70:1.

In one embodiment, the present invention is directed to a curable, powdered phenol-aldehyde resole resin prepared by spray drying an aqueous phenol-formaldehyde resin, wherein the aqueous phenol-formaldehyde resin comprises an alkaline reaction product of phenol and formaldehyde reacted in the presence of a source of calcium ions, and wherein: (A) the aqueous phenol-formaldehyde resin is prepared at a cumulative formaldehyde to phenol mole ratio (F:P) in the range of 1.5:1 to 2.6:1, (B) the aqueous phenol-formaldehyde resin has a total alkalinity in the range of 1.5 to 8 percent by weight and (C) the aqueous phenol-formaldehyde resin is prepared in the presence of an amount of calcium ions sufficient to provide a phenol to calcium mole ratio (P:Ca) in the range of 35:1 to 70:1, and wherein the powdered resin is suitable for bonding a wood composite.

In one embodiment, the present invention is directed to a method of making an aqueous phenol-formaldehyde resin, suitable for making a curable, powdered wood adhesive resin by spray-drying, comprising: establishing an aqueous solution of phenol and an amount of a calcium ion source sufficient to provide a phenol to calcium mole ratio (P:Ca) in the range of 35:1 to 70:1; reacting an amount of formaldehyde, sufficient to establish a formaldehyde to phenol mole ratio (F:P) in the aqueous solution in the range of 0.6:1 to 1.6:1, with the phenol in the aqueous solution to form a reaction product; and reacting an additional amount of formaldehyde, sufficient to establish a cumulative phenol to formaldehyde mole ratio (F:P) in the aqueous solution in the range of 1.5:1 to 2.6:1, with the reaction product, and in the presence of a base, such as an inorganic base and especially an alkali metal hydroxide, in an amount sufficient to establish a total alkalinity in the range of 1.5 to 8 percent by weight, usually in the range of 3 to 6 percent by weight, to form said phenol-formaldehyde resin.

In one embodiment, the present invention is directed to a wood composite prepared using a curable, powdered phenol-formaldehyde resin prepared by spray drying an aqueous phenol-formaldehyde resin, wherein the aqueous phenol-formaldehyde resin comprises an alkaline reaction product of phenol and formaldehyde reacted in the presence of a source of calcium ions, and wherein: (A) the aqueous phenol-formaldehyde resin is prepared at a cumulative formaldehyde to phenol mole ratio (F:P) in the range of 1.5:1 to 2.6:1, (B) the aqueous phenol-formaldehyde resin has a total alkalinity in the range of 1.5 to 8 percent by weight and (C) the aqueous phenol-formaldehyde resin is prepared in the presence of an amount of calcium ions sufficient to provide a phenol to calcium mole ratio (P:Ca) in the range of 35:1 to 70:1.

In one embodiment, the present invention is directed to a method for preparing a wood composite by pressing a mat comprising wood pieces having applied thereto curable, powdered (solid particulate) phenol-formaldehyde resin made by spray drying an aqueous phenol-formaldehyde resin, wherein the aqueous phenol-formaldehyde resin comprises an alkaline reaction product of phenol and formaldehyde reacted in the presence of a source of calcium ions, and wherein: (A) the phenol-formaldehyde resin is prepared at a formaldehyde to phenol mole ratio (F:P) in the range of 1.5:1 to 2.6:1, (B) the phenol-formaldehyde resin is prepared at a total alkalinity in the range of 1.5 to 8 percent by weight and (C) the phenol-formaldehyde resin is prepared in the presence of an amount of calcium ions sufficient to provide a phenol to calcium mole ratio (P:Ca) in the range of 35:1 to 70:1.

DETAILED DESCRIPTION OF THE INVENTION

Figure 1:
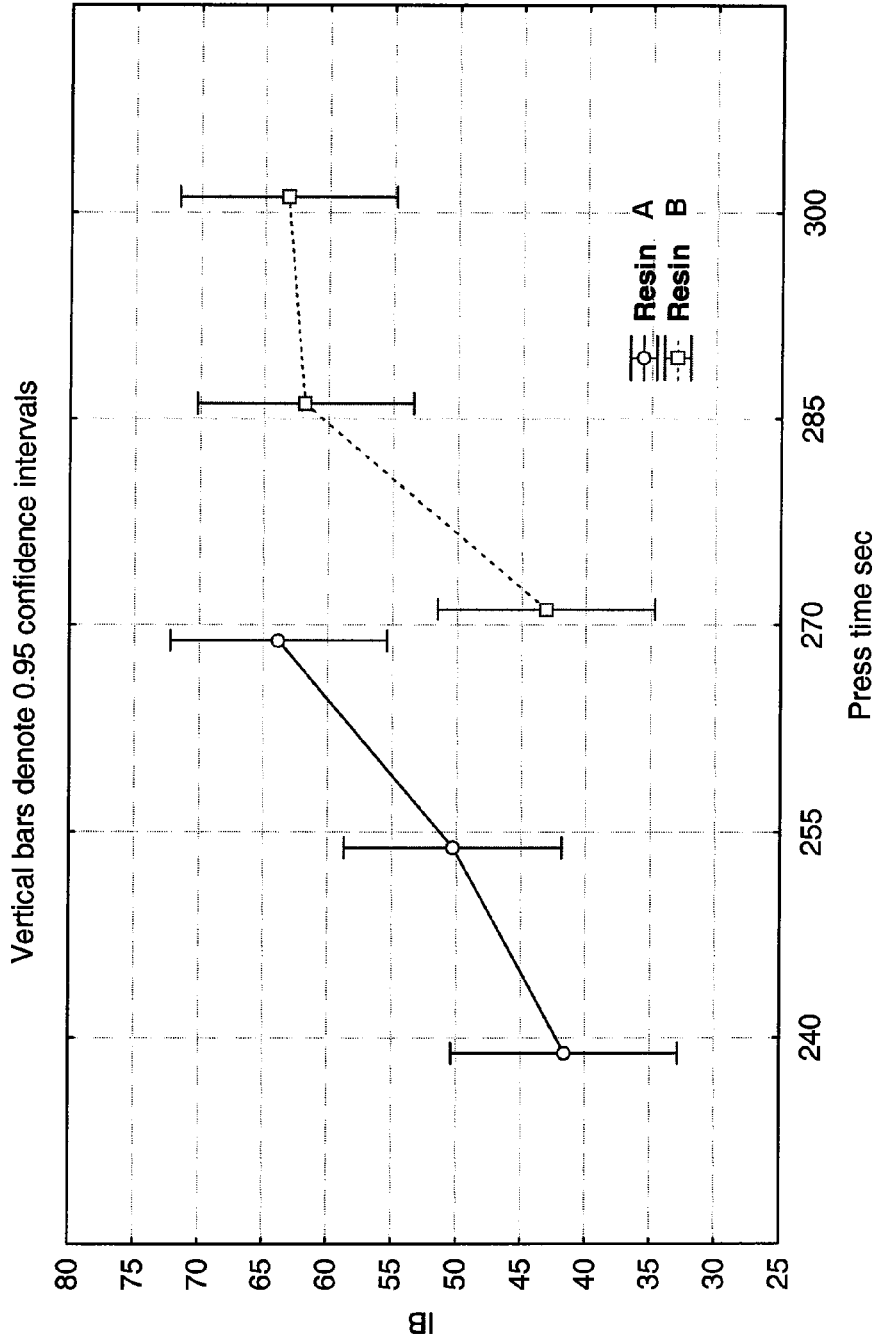
FIG. 1 plots the average internal bond strength (IB) of wood composite panels made at three different press times and made using a prior art resin powder (Resin A) and a resin powder of the present invention (Resin B).

The present invention is directed to an aqueous phenol-formaldehyde resin (resole resin) suitable for making a curable, powdered wood adhesive for bonding wood composites wherein the aqueous phenol-formaldehyde resin is prepared under alkaline conditions; at a cumulative formaldehyde to phenol mole ratio (F:P) in the range of 1.5:1 to 2.6:1 and in the presence of an amount of calcium ions sufficient to provide a phenol to calcium mole ratio (P:Ca) in the range of 35:1 to 70:1.

In accordance with one embodiment, a calcium ion source is combined in an aqueous solution with phenol, wherein the phenol is provided in an amount relative to the calcium ion source sufficient to provide a phenol to calcium mole ratio (P:Ca) in the range of 35:1 to 70:1. An amount of formaldehyde, sufficient to establish a formaldehyde to phenol mole ratio (F:P) in the range of 0.6:1 to 1.6:1, is thereafter reacted, under an alkaline reaction condition, with the phenol in the aqueous solution. Following the initial reaction, an additional amount of formaldehyde is added to the aqueous solution, sufficient to establish a cumulative phenol to formaldehyde mole ratio (F:P) in the range of 1.5:1 to 2.6:1. In the presence of a base (alkaline catalyst), usually an inorganic base and especially an alkali metal hydroxide, sufficient to establish a total alkalinity in the aqueous solution in the range of 1.5 to 8 percent by weight, and usually a total alkalinity in the aqueous solution in the range of 3 to 6 percent by weight, the added formaldehyde reacts with species in the solution (the reaction product) to form a phenol-formaldehyde resole resin.

Spray dried resin powder (resin particulates), prepared by spray drying the aqueous phenol-formaldehyde resole resin of the present invention, has particular utility in the preparation of wood composites made from wood (lignocellulosic) pieces (such as wood stands, wood chips, wood flakes, or wood fibers). Wood composite products that can be made using such resin particulates particularly include: oriented strand board (OSB), oriented strand lumber (OSL), medium density fiberboard (MDF), Paralam®, hardboard, waferboard, chipboard, particleboard, flakeboard and the like. Consolidated wood composites of an acceptable internal bond strength and a surprisingly improved durability are formed by using the curable, powdered phenol-formaldehyde resole resin of the present invention.

In accordance with the present invention, an aqueous phenol-formaldehyde resole resin composition is prepared that is then spray dried using conventional techniques and equipment to form the curable resole resin powder used to form a wood composite.

A suitable aqueous phenol-formaldehyde resole resin composition can be produced by reacting phenol and formaldehyde in water under an alkaline condition and in the presence of a calcium ion source.

Suitable methods for synthesizing an aqueous phenol-formaldehyde resole resin composition include both batch and continuous processes, especially "programmed" processes (i.e., staged addition). In its broadest aspects, the present invention can use such variations for making the aqueous phenol-formaldehyde resole resin ultimately destined to be spray-dried to make the inventive curable, powdered resole resin.

Conveniently, a batch process can be used to synthesize the aqueous phenol-formaldehyde resole resin composition of the present invention. In accordance with one embodiment of the present invention, an aqueous alkaline solution of phenol and a calcium ion source is initially established in a suitable reactor by combining phenol, a calcium ion source and a suitable base, usually an inorganic base and especially an alkali metal hydroxide (e.g., sodium hydroxide). For example, calcium hydroxide (in the form of hydrated or slaked lime) can be added with suitable agitation to an aqueous solution of phenol. An amount of calcium hydroxide, relative to the amount of phenol, sufficient to provide a phenol to calcium (P:Ca) mole ratio in the range of 35:1 to 70:1, usually a mole ratio in the range of 40:1 to 60:1 is used.

Calcium hydroxide has proven to be a suitable calcium ion source. Other sources of calcium ion include calcium oxide (lime), calcium chloride, calcium sulfate and calcium carbonate. Based on performance and convenience, calcium hydroxide and calcium oxide are generally considered the best choices to use as the source of calcium ions.

An additional base, usually an inorganic base and especially an alkali metal hydroxide such as sodium hydroxide or potassium hydroxide, also is added to the aqueous phenol solution to assist and maintain the solubility of the calcium ion source and to ensure the establishment of a suitable alkaline condition for the subsequent reaction between phenol and formaldehyde. Usually, an amount of base is added to establish an initial alkalinity in the aqueous solution (before any formaldehyde is added) of from 1.5 to 5% by weight, usually from 2 to 4.5% by weight.

In accordance with the present invention "alkalinity" is reported as the equivalent percent by weight of sodium hydroxide in the aqueous solution. In particular, to the extent a base other than sodium hydroxide is used, the alkalinity content should be proportioned to be equivalent on a molar weight basis to the above noted alkalinity range based on sodium hydroxide. For example, to attain the equivalent of an alkalinity of 3%, i.e., 3 grams of sodium hydroxide in 100 grams of aqueous solution, about 4.2 grams of potassium hydroxide in 100 grams of the aqueous solution would be required. As another example, if 100 grams of the aqueous solution contains 2.4 grams of sodium hydroxide and 1 gram of calcium hydroxide, the alkalinity of the solution is about 2.9%.

Once an aqueous solution of phenol and calcium ions at a suitable level of alkalinity has been established, formaldehyde then is added to initiate the phenol-formaldehyde condensation reactions. An amount of formaldehyde is added to the aqueous solution to provide a formaldehyde to phenol mole ratio (F:P) in the aqueous solution in the range of 0.6:1 to 1.6:1, usually an F:P mole ratio between 0.9:1 and 1.4:1. Usually, the formaldehyde is slowly added to the aqueous solution, and the temperature is allowed to increase up towards atmospheric reflux conditions. The total amount of phenol and formaldehyde in the aqueous solution is limited by solubility considerations and the ability to control the exothermic reaction kinetics. Usually, throughout the synthesis of the resole resin, the phenol and formaldehyde will constitute between about 30 and 75 percent by weight of the aqueous solution, typically about 50 and 65 percent by weight.

The temperature of the reaction mixture is allowed to increase to atmospheric reflux, held there for a suitable period of time to complete the initial reaction and then is cooled to a temperature in the range of 60 to 95° C., for example to a temperature of about 85° C. The total reaction time between initiating the addition of formaldehyde to when the reaction mixture has been fully cooled is typically between 15 and 90 minutes, for example a period of about 85 minutes should be suitable. The purpose of this initial reaction phase is to promote methylolation of the phenol and initiate the condensation of the resin.

While not wishing to be bound to the following explanation, applicants believe that the presence of the calcium ions in this initial reaction phase facilitates the preferential formation of ortho substitution on the phenol-formaldehyde oligomeric species (the reaction products) that are formed by the initial condensation reactions, leading to a more linear resin structure than would otherwise occur under similar reaction conditions in the absence of the calcium ions.

Following this initial reaction phase, additional base, usually an inorganic base and especially an alkali metal hydroxide such as sodium hydroxide, is added to the reaction mixture (aqueous solution). Due to its availability, cost and performance, an alkali metal hydroxide and especially sodium hydroxide is the usual base of choice. An amount of base is added to establish the total alkalinity in the aqueous reaction mixture to a value in the range of 1.5 to 8 percent by weight, usually in the range of 3 to 7 percent by weight. Maintaining the reaction mixture at a temperature in the range of 60 to 95° C., for example at a temperature of about 85° C., the reaction mixture is advanced to a suitable viscosity. Usually, advancing the reaction mixture to a viscosity in the range of RS to ZZ on the Gardener-Holdt scale, for example a Gardener-Holdt viscosity of UV-V V at a solids content in the range of 35 to 55 percent by weight should be suitable.

At this point the reaction mixture is cooled to a temperature in the range of 50 to 90° C., for example to a temperature of about 70° C., and additional formaldehyde, in an amount sufficient to bring the cumulative F:P mole ratio to within the range of 1.5:1 to 2.6:1, usually within the range of 2.1:1 to 2.5:1, is slowly added. Further reaction between the added formaldehyde and the phenol-formaldehyde oligomeric species (the reaction product) previously formed in the reaction mixture continues at this temperature until the reaction mixture is advanced to a suitable viscosity. Usually, advancing the reaction mixture to a viscosity in the range of L to W on the Gardener-Holdt scale, for example a Gardener-Holdt viscosity of OP-P P at a solids content in the range of 35 to 55 percent by weight should be suitable.

At the conclusion of the resin synthesis, additional ingredients may be added to the aqueous mixture, to adjust the final alkalinity and reduce the level of free formaldehyde. Such ingredients may include urea and aqueous ammonia (ammonium hydroxide).

Formaldehyde for use in preparing the aqueous phenol-formaldehyde resin is available as paraformaldehyde (a solid, polymerized formaldehyde) and more conveniently as formalin solutions (aqueous solutions of formaldehyde, sometimes with methanol, usually in 37%, 44%, or 50% formaldehyde concentrations). Formaldehyde also may be available as a gas. In the broad practice of the present invention, any of these forms may be suitable, though the use of a low methanol-containing 50% by weight aqueous solution of formaldehyde is generally favored. Further, in some circumstances the formaldehyde may be partially replaced with other suitable aldehydes, such as acetaldehyde or furaldehyde, as known in the wood composite art. Thus, the reference herein to "formaldehyde" does not limit the invention to formaldehyde, but denotes use of such formaldehyde alternatives.

Phenol (i.e., hydroxybenzene) used for making the phenol-formaldehyde resole resin may be replaced, partially or totally in some cases, with other phenolic compounds unsubstituted at the two ortho positions, or at one ortho and the para position. Thus, reference herein to "phenol" denotes such phenol derivatives, as well as phenol itself. These unsubstituted positions are necessary for the desired polymerization reaction(s) to occur. Any one, all, or none of the remaining carbon atoms of the phenol ring can be substituted in a conventional fashion. The nature of the substituents can vary widely, and it is only necessary that the substituent not interfere in the polymerization of the aldehyde with the phenol at the ortho and/or para positions. Substituted phenols which optionally can be employed in the formation of the phenol-formaldehyde resole resin include alkyl substituted phenols, aryl substituted phenols, cycloalkyl substituted phenols, alkenyl substituted phenols, alkoxy substituted phenols, aryloxy substituted phenols, and halogen substituted phenols, the foregoing substituents possibly containing from 1 to 26, and usually from 1 to 9, carbon atoms.

Specific examples of suitable phenolic compounds for replacing a portion or all of the phenol used in preparing the phenol-formaldehyde resin compositions used in the present invention include: bis-phenol A, bis-phenol F, o-cresol, m-cresol, p-cresol, 3,5-5 xylenol, 3,4-xylenol, 3,4,5-trimethylphenol, 3-ethyl phenol, 3,5-diethyl phenol, p-butyl phenol, 3,5-dibutyl phenol, p-amyl phenol, p-cyclohexyl phenol, p-octyl phenol, 3,5 dicyclohexyl phenol, p-phenyl phenol, p-phenol, 3,5-dimethoxy phenol, 3,4,5 trimethoxy phenol, p-ethoxy phenol, p-butoxy phenol, 3-methyl-4-methoxy phenol, p-phenoxy phenol, naphthol, anthranol and substituted derivatives thereof.

The resulting aqueous phenol-formaldehyde resole resin has an alkalinity, i.e., contains a base, in the range of 1.5% to 8%, more usually in the range of 3% to 6%, based on the weight of the aqueous resole resin.

In accordance with the present invention, the aqueous resole resin then is converted into a solid, particulate form, usually by spray-drying. In the broad practice of the present invention the solid, particulate resole resin can be prepared from the aqueous, calcium-modified resole resin using any suitable technique. Thus, the solid particulate phenol-formaldehyde resole resin can be powdered, granular, flaked, chipped, spray dried, freeze dried, or ground.

Methods for preparing a spray-dried resole resin are well known to those skilled in the art of wood composite binders and a detailed description is unnecessary. Spray drying refers to the technically sophisticated process of atomizing (in the form of finely divided droplets) the aqueous resin into a gas stream (often a heated air stream) under controlled temperature conditions and under specific gas/liquid contacting conditions to effect evaporation of water from the atomized droplets and production of a dry particulate solid product.

In the spray drying process, the calcium-modified, aqueous resole resin is atomized to fine droplets and mixed with hot air (e.g., air at a temperature of 180 to 210° C.) to evaporate the water from the resin droplets. The temperature of the resin is heated usually close to the boiling water temperature or higher. Spray drying is typically carried out with pressure nozzles (nozzle atomization) or centrifugal atomizers operating at high speeds (e.g., a spinning disc). Despite the high velocity generation of droplets, a spray dryer is designed so that the droplets avoid a much as possible contact with the spray dryer wall under proper operating procedures. This effect is achieved by a precise balance of atomizer velocity, air flow, spray dryer dimensions of height and diameter, and inlet and outlet means to produce a cyclonic flow of gas, e.g., air in the chamber. A pulse atomizer also can be used to produce the small droplets needed to facilitate evaporation of the water. The outlet temperature is generally from about 60° C. to 95° C. (140° F. to 203° F.) and often from about 75° C. to 90° C. (167° F. to 194° F.). Usually, the aqueous phenol-aldehyde resin supplied to the spray dryer will have a resin solids content of about 25% to 50% by weight. In some cases, it may be desirable to include a flow promoter or drying agents, such as calcium silicate, in the aqueous dispersion that is processed in a spray dryer or is added thereafter simply to facilitate subsequent handling and transport of the spray dried powder (e.g., to avoid clumping).

The particle size distribution, moisture content, and bulk density of the spray dried resin is controlled by operations well known in the spray drying art by variables such as feed resin solids content of the aqueous mixture, surface tension, speed of the rotary atomizer, feed rate of the aqueous resin, and the temperature differences between the inlet and outlet (atomization gas temperature). Particle size distribution may be an important factor in production of a powdered resin. In the case of a powdered resin for waferboard/oriented strandboard applications, at a given resin application level, the smaller the powder resin particle size, the greater the area of coverage of the wood pieces, e.g., wood wafers or wood strands. A suitable range of particle sizes for waferboard/oriented strandboard applications is having 80 to 90% by weight of the resin powder less than 75 microns and 60 to 70% by weight less than 45 microns.

If a desired particle size is not produced directly by the technique used to produce the resole resin particulate solids, additional mechanical grinding can be employed to reduce the distribution of the particle sizes further.

The amount of curable, powdered phenol-formaldehyde resole resin used as an adhesive binder for manufacturing a wood composite panel will generally depend on the characteristics desired in the final wood composite product. Generally, the amount of binder can vary from about 1 weight percent up to about 12 weight percent of resin solids based on oven dry weight of the wood pieces. Usually, at least 2 percent by weight and no more than about 8 percent by weight should be needed in most cases. While more resin solids than 12 weight percent can be used; a greater amount is not usually cost efficient.

As appreciated by those skilled in the art, during the preparation of the wood composite, wax also can be applied to the wood pieces. Wax is commonly applied in order to enhance the moisture resistance of the wood composite.

Regardless of the technique used to apply the binder components to the wood pieces, the resin treated wood material is formed into a mat and positioned within a press cavity for consolidating the mat into a unitary composite. Such presses generally have a press cavity defined by opposing press platens. The press platens are heated and the press may also be designed to allow steam to be injected into the cavity where the wood composite is formed between the platens.

While acceptable wood composite products can be obtained using wood pieces having an average moisture content above 10 percent by weight, for more efficient operation, the average moisture content of the wood pieces in the mat entering the press should not exceed about 9 percent by weight. Usually, the average moisture content of the wood pieces will be between 3 percent and 9 percent by weight.

In accordance with the method of the present invention, once the mixture of resin treated wood pieces is readied for consolidation, a mat of the mixture is formed in or is introduced into a suitable press cavity.

After the mat of resin treated wood pieces mat is disposed within the press cavity, the press can be closed to its final position for making a wood composite product of a specific thickness.

The quantity of wood furnish introduced into the press is proportioned so that closing the press to the desired thickness for the wood composite can be accomplished at conventional press platen pressures. Consolidation pressures within the mat between about 80 to 750 psig are typical. Typical press platen temperatures can range from about 135° C. to 230° C. (275° F. to 446° F.), with a press platen temperature of about 210° C. (410° F.) being more typical.

As shown in the following examples, applicants have observed that the particulate resole resin of the present invention has better flow properties under a given set of press conditions than a current commercial powdered resole resin. While not wishing to be bound by the following explanation, applicants believe that the improved flow properties of the curable, powdered resin of the present invention results in better resin coverage of the molten resin over the wood pieces as the resin cures during the consolidation of the wood composite. The better coverage results in boards exhibiting improved durability.

In further embodiments, the present invention is:
1. A phenol-formaldehyde resole resin suitable for making a curable, powdered wood adhesive resin by spray-drying, wherein the phenol-formaldehyde resole resin comprises an aqueous, alkaline reaction product of phenol and formaldehyde reacted in the presence of a source of calcium ions, and wherein: (A) the phenol-formaldehyde resin is prepared at a cumulative formaldehyde to phenol mole ratio (F:P) in the range of 1.5:1 to 2.6:1, (B) the phenol-formaldehyde resin has a total alkalinity in the range of 1.5 to 8 percent by weight and (C) the phenol-formaldehyde resin is prepared in the presence of an amount of calcium ions sufficient to provide a phenol to calcium mole ratio (P:Ca) in the range of 35:1 to 70:1.
2. The phenol-formaldehyde resole resin of the previous embodiment wherein the phenol to calcium mole ratio (P:Ca) is in the range of 40:1 to 60:1.
3. The phenol-formaldehyde resole resin according to any of the previous embodiments wherein the cumulative formaldehyde to phenol mole ratio (F:P) is in the range of 2.1:1 to 2.5:1
4. The phenol-formaldehyde resole resin according to any of the previous embodiments wherein the phenol-formaldehyde resin has a total alkalinity in the range of 3 to 6 percent by weight
5. A curable, powdered phenol-aldehyde resole resin prepared by spray drying the phenol-formaldehyde resole resin according to any of the previous embodiments.
6. A wood composite comprising wood pieces bound together by a cured, powdered resole resin made according to the previous embodiment.
7. A method of making a wood composite comprising mixing a curable, powdered phenol-formaldehyde resin prepared by spray drying an aqueous phenol-formaldehyde resin according to any of the previous embodiments with wood pieces; forming the wood pieces into a mat and consolidating the mat, through the application of heat and pressure, into the wood composite.

8. A method of making an aqueous phenol-formaldehyde resin, suitable for making a curable, powdered wood adhesive resin by spray-drying, comprising: establishing an aqueous solution of phenol and an amount of a calcium ion source sufficient to provide a phenol to calcium mole ratio (P:Ca) in the range of 35:1 to 70:1; reacting an amount of formaldehyde, sufficient to establish an initial formaldehyde to phenol mole ratio (F:P) in the aqueous solution in the range of 0.6:1 to 1.6:1, with the phenol in the aqueous solution to form a reaction product; and reacting an additional amount of formaldehyde, sufficient to establish a cumulative phenol to formaldehyde mole ratio (F:P) in the aqueous solution in the range of 1.5:1 to 2.6:1, with the reaction product and in the presence of a base sufficient to establish a total alkalinity in the range of 1.5 to 8 percent by weight to form said aqueous phenol-formaldehyde resin.

9. A method of making an aqueous phenol-formaldehyde resin according to the previous embodiment wherein the phenol to calcium mole ratio (P:Ca) is in the range of 40:1 to 60:1.

10. A method of making an aqueous phenol-formaldehyde resin according to any of the previous embodiments wherein the initial formaldehyde to phenol mole ratio (F:P) in the aqueous solution in the range of 0.9:1 to 1.4:1.

11. A method of making an aqueous phenol-formaldehyde resin according to any of the previous embodiments wherein the phenol-formaldehyde resin has a total alkalinity in the range of 3 to 6 percent by weight.

12. A method of making an aqueous phenol-formaldehyde resin according to any of the previous embodiments wherein the base is an inorganic base.

13. A method of making an aqueous phenol-formaldehyde resin according to any of the previous embodiments wherein the inorganic base is an alkali metal hydroxide.

14. A method of making an aqueous phenol-formaldehyde resin according to any of the previous embodiments wherein the inorganic base is sodium hydroxide.

15. A method of making an aqueous phenol-formaldehyde resin according to any of the previous embodiments wherein the cumulative formaldehyde to phenol mole ratio (F:P) in the range of 2.1:1 to 2.5:1

The following examples provide illustrative embodiments of the present invention and are not intended as a limitation on the scope of the invention. Unless otherwise indicated, all parts and percentages are by weight.

EXAMPLE 1

Liquid PF Resin

A calcium-modified aqueous phenol-formaldehyde resole resin of the present invention can be prepared in the following manner. 26.9 parts by weight (pbw) phenol is mixed with 12.55 pbw water and heated to about 55° C. (131° F.) in a suitable reaction vessel equipped with vacuum condenser and cooling coil. About 0.45 pbw hydrated lime (4.5% by weight excess moisture) is rapidly added to the aqueous phenol solution and the solution is allowed to exotherm to about 60° C. (140° F.). Thereafter, sodium hydroxide (2 pbw of a 50% by weight aqueous solution) is slowly added to the aqueous mixture. The resulting exothermic heat increases the temperature of the aqueous solution to about 75° C. (167° F.). 20.6 pbw of a 50% by weight aqueous formaldehyde solution of a low methanol content is then slowly added (e.g., over 30 minutes) to the aqueous solution in the reaction vessel. The ensuing exothermic reactions, with heat added as necessary, causes the temperature of the reaction mixture to increase first to about 93° C. (199° F.) and then over 10 additional minutes to atmospheric reflux. The reaction mixture is refluxed for 30 minutes and then cooled to 85° C. (185° F.). Additional sodium hydroxide (4.5 pbw of a 50% by weight aqueous solution) is slowly added while maintaining that temperature. The reaction mixture is then allowed to advance to a Gardener-Holdt viscosity of UV-V V. After cooling the reaction mixture to 70° C. (158° F.), an additional amount of formaldehyde is slowly added (19.75 pbw of a 50% by weight aqueous solution over about 30 minutes). The reaction is allowed to proceed at a temperature of 70° C. (158° F.), to a desired viscosity (Gardener-Holdt of OP-P P). At this point, urea (5 pbw of a 50% by weight aqueous solution) and additional water (1.25 pbw) are added as the viscosity is allowed to increase further to a desired viscosity (Gardener-Holdt of U-UV UV). The aqueous resin is then cooled to about 45° C. (113° F.), and 6.25 pbw water and 0.75 pbw of aqueous ammonia (28% by weight ammonia). The resulting resole resin exhibits a non-volatile (solids) content of about 45% by weight, and a total alkalinity of about 3.8%.

EXAMPLE 2

Solid Particulate PF Resole Resin

The resin solution of Example 1 is spray dried to produce a resole resin powder. Depending on the conditions of the spray-drying, applicants have produced powdered resole resin having a bulk density between 34 and 42 pounds per cubic foot (0.54 to 0.67 grams per cubic centimeter).

EXAMPLE 3

Preparation of Wood Composites

Wood composites were made with a Wabash Metal Products, Mosel 200-2424-2™ laboratory press. The platens were heated electrically to a temperature of 210±5.5° C. (410±10° F.) and the press hydraulics were operated by a computer.

Mats of binder-treated wood pieces were inserted into the press. The wood pieces were nominal 3 inch CAE lab produced southern-yellow pine flakes dried to an average moisture content of about 4 to 4.5% by weight. The wood pieces were mixed in a lab drum with molten slack wax (1.5% by weight on the basis of the oven dried weight of the wood flakes) and a solid particulate resole resin (2.6% by weight on the basis of the oven dried weight of the wood flakes).

Single layer, non-oriented mats were formed and loaded into the press.

Following the loading of the mat into the press, the press was closed. In one series of tests (Press Time Series), wood composites 18 inches by 18 inches were prepared by closing the press to a target thickness of ¾ inch to produce a composite having a target density of about 42 pounds per cubic foot (0.67 grams per cubic centimeter). In another series of tests (Specific Pressure Series), the press was operated with a specific press cycle to produce composites 22 inches by 22 inches with a thickness of ¾ inch and a target density of about 39 pounds per cubic foot (0.62 grams per cubic centimeter).

EXAMPLE 4

Comparison of Wood Composites

Wood composites were prepared in accordance with both the Press Time Series protocol and the Specific Pressure Series protocol using (1) a resole resin spray dried powder that is used to produce a ground resole resin powder that is currently sold commercially by Georgia-Pacific Chemicals LLC for use in OSB manufacture (Resin A) and a resole resin spray dried powder prepared by spray drying an aqueous resole resin made in accordance with the method of Example 1 (Resin B).

Press Time Results

Figure 2:
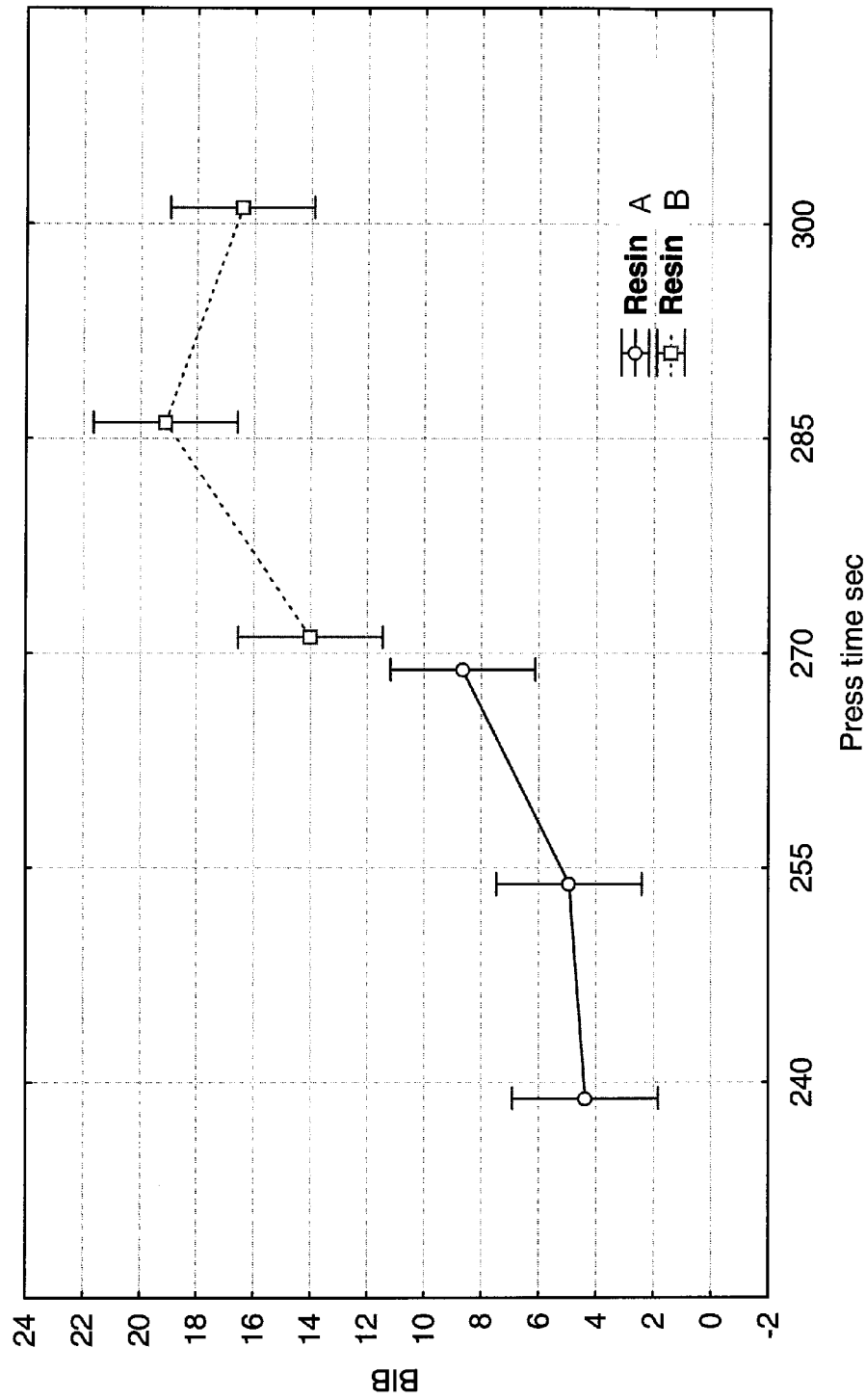
FIG. 2 plots the average 2 hour boil internal bond strength (BIB) of wood composite panels made at three different press times and made using a prior art resin powder (Resin A) and a resin powder of the present invention (Resin B).

Wood composites made by the Press Time Series protocol were tested for Internal Bond (IB, psi), and two-hour boil Internal Bond (BIB, psi). One panel was prepared at each press time and 11 to 12 samples were tested from each panel. The attempt to make a panel with Resin A at a press time of 225 seconds resulted in delamination; while the attempt to make a panel with Resin B at a press time of 255 seconds resulted in delamination (considered minimum press times for the respective resins). Panels were then pressed at three 15 second intervals above the minimum press time for each of the resins and then tested for both IB and BIB. The average IB and BIB results for each panel prepared at the respected press times are presented respectively in FIG. 1 and FIG. 2.

These results show that though the cure speed of Resin A is about 7 to 14 percent faster than that of Resin B (data from FIG. 1), the durability of the panels prepared using resin B was surprisingly better than the durability of panels made using Resin A. (data from FIG. 2). Indeed, at the same press time of 270 seconds, the panel made using Resin B had a 60% higher average BIB value than the panel made using Resin A. Applicants submit that this result demonstrates that Resin B exhibits better flow under the panel consolidation conditions precedent to cure and produces an overall stronger adhesive bond as a result of the improved resin coverage.

Specific Pressure Results

Figure 3:
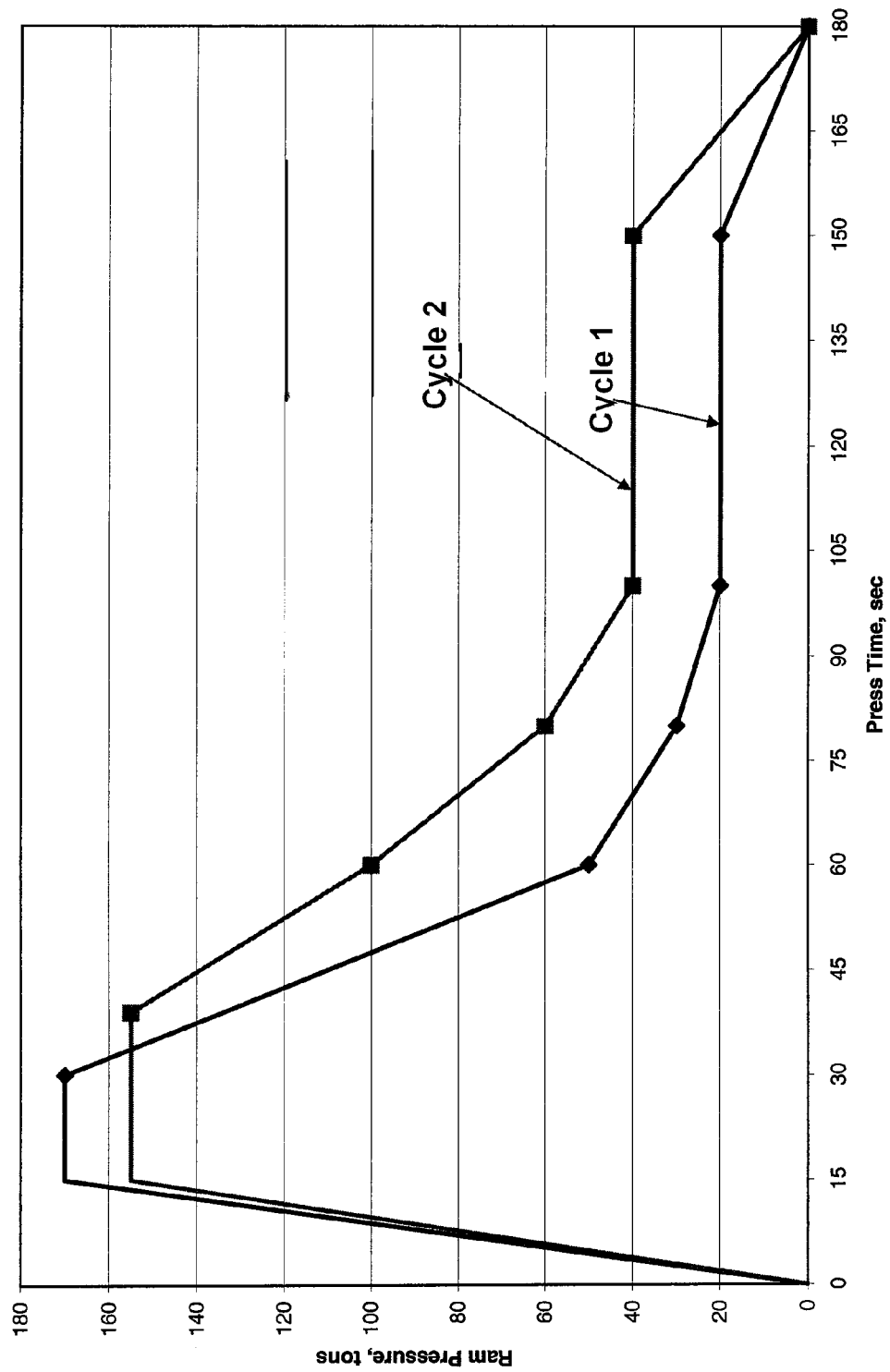
FIG. 3 plots the force (psi) on a panel 22 inches by 22 inches as a function of the pressure ($Tons_f$) exerted by the 14 inches diameter ram press for two different pressing cycles.

FIG. 3 illustrates the two pressure cycles (different pressing strategies) used during the testing. One of the strategies (identified as Cycle 1 in FIG. 3) results in a lower specific pressure on the mat during the later stages of the press cycle. The second strategy (identified as Cycle 2) doubles the specific pressure in the mat at that same point in the cycle. Panels made using these two pressing strategies were tested for D4 bending strength only.

The D4 flex test method examines the ultimate bending strength of a panel after accelerated bond (panel) degradation. Samples 17 inches by 3 inches were prepared from the consolidated panels and subjected to a 30 minute vacuum soak in water (vacuum of about 15 inches Hg vacuum pressure (380 mm Hg)) at a temperature of about 150° F. (65.6° C.), followed by at least a 15 hour drying time at a temperature of about 180° C. (82.2° C.). Once the panels have cooled to ambient temperature, the bending strength ($lb_f$-inch) of the samples is measured using a Universal testing machine and bending test fixture.

Figure 4:
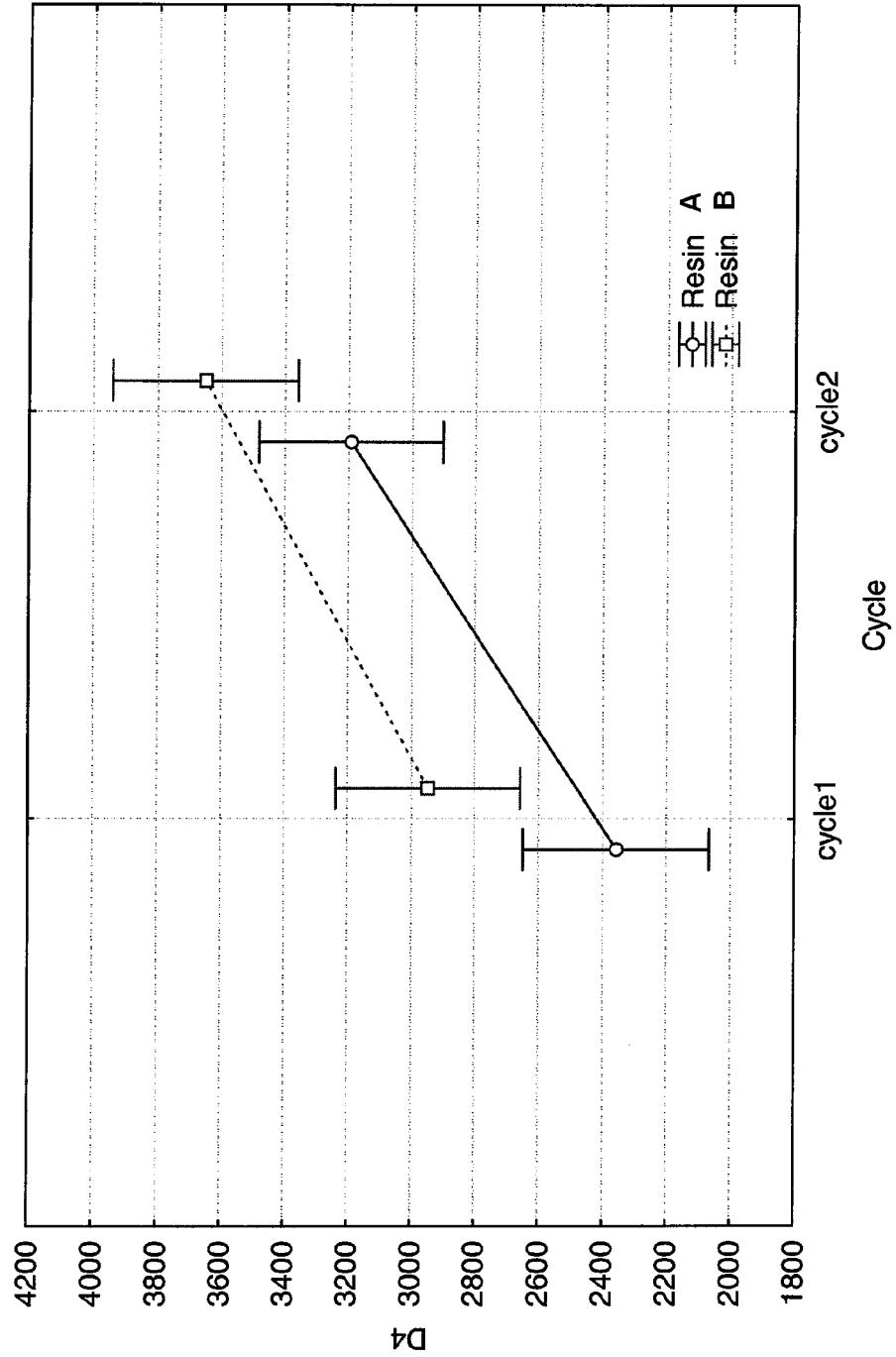
FIG. 4 plots the average D4 bending strength results of wood composite panels made at the two pressing cycles illustrated in FIG. 3 and made using a prior art resin powder (Resin A) and a resin powder of the present invention (Resin B)

The average D4 test results for panels (average of 12 samples) made using Resin A and Resin B, in accordance with Cycle 1 and Cycle 2 of FIG. 3, are presented in FIG. 4. As shown, the average D4 bending strength testing results for the panels made with Resin B pressed at the lower specific pressure (Cycle 1) were superior compared to the results for the panels made with Resin A using the same press cycle. Using the cycle that provided the higher specific pressure (Cycle 2), the panels made with Resin B again exhibited a higher D4 value than the results for Resin A panels, though not as significantly better as observed in the Cycle 1 testing.

These overall results unexpectedly indicate that Resin B, although slightly slower in cure speed than Resin A, provides better bonding at a lower specific pressure and produces boards of enhanced durability. Another consequence of the improved flow characteristics of the curable, powdered resin of the present invention is that wood composite manufacturers using the inventive resin can operate their presses at lower pressures. Lower pressure operation reduces the stress on the press and increases press longevity.

The present invention has been described with reference to specific embodiments. However, this application is intended to cover those changes and substitutions that may be made by those skilled in the art without departing from the spirit and the scope of the invention. Unless otherwise specifically indicated, all percentages are by weight. Throughout the specification and in the claims the term "about" is intended to encompass + or −5% and preferably is only about + or −2%.

As stated above, the formaldehyde component of the inventive resin is not limited to formaldehyde itself, but encompasses any formaldehyde derivative and other aldehydes or derivatives thereof which are known in the art to be useful in conjunction with phenol-formaldehyde resins. However, formaldehyde is the preferred aldehyde. Thus, it is understood that when the formaldehyde component of the resin is referred to herein, this refers to formaldehyde, formaldehyde derivatives, and other aldehydes.

In addition, although phenol itself is preferably utilized in order to produce a resin which can be made economically on a commercial scale, many other compounds are useful as the phenol or phenol derivative of the present invention. As noted above, such useful phenols include substituted phenols such as cresols and xylenols. Therefore, it is also understood that when the phenol component of the resin is referred to herein, this refers to both phenol itself and phenol derivatives.

We claim:

1. A wood adhesive prepared by spray drying an aqueous phenol-formaldehyde resin, wherein:
   the aqueous phenol-formaldehyde resin comprises an alkaline reaction product of phenol and formaldehyde prepared at a cumulative formaldehyde to phenol molar ratio (F:P) of 1.5:1 to 2.6:1,
   the aqueous phenol-formaldehyde resin has a total alkalinity of 1.5 to 8 percent by weight of the aqueous phenol-formaldehyde resin,
   the aqueous phenol-formaldehyde resin is prepared in the presence of calcium ions in an amount sufficient to provide a phenol to calcium molar ratio (P:Ca) of 35:1 to 70:1, and
   the wood adhesive is in a powdered form.

2. A method for making a wood adhesive comprising:
   spray drying an aqueous phenol-formaldehyde resin to provide a powdered resin, wherein:
      the aqueous phenol-formaldehyde resin comprises an alkaline reaction product of phenol and formaldehyde reacted in the presence of a source of calcium ions,
      the aqueous phenol-formaldehyde resin has a total formaldehyde to total phenol molar ratio (F:P) of 1.5:1 to 2.6:1,
      the aqueous phenol-formaldehyde resin has a total alkalinity of 1.5 to 8 percent by weight of the aqueous phenol formaldehyde resin, and
      the aqueous phenol-formaldehyde resin has a molar ratio of phenol to calcium ions (P:Ca) of 35:1 to 70:1.

3. A wood composite comprising wood pieces bound together by the wood adhesive of claim 1.

4. A method for making a wood composite comprising:
   mixing wood pieces and the wood adhesive of claim 1;
   forming the wood pieces into a mat; and
   consolidating the mat into the wood composite through the application of heat and pressure.

5. The wood adhesive of claim 1, wherein the wood adhesive has a bulk density of about 0.54 grams per cubic centimeter to about 0.67 grams per cubic centimeter.

6. A method for making a wood adhesive, comprising:
spray drying an aqueous phenol-formaldehyde resin to provide a powdered resin having a bulk density of 0.54 grams per cubic centimeter to about 0.67 grams per cubic centimeter, wherein the aqueous phenol-formaldehyde resin comprises:
an alkaline reaction product of phenol and formaldehyde prepared in the presence of calcium ion source and an alkaline catalyst, wherein the calcium ion source and the alkaline catalyst are different,
a cumulative formaldehyde to phenol molar ratio (F:P) of 1.5:1 to 2.6:1,
a total alkalinity of 1.5 to 8 percent by weight of the aqueous phenol-formaldehyde resin, and
a phenol to calcium molar ratio (P:Ca) of 35:1 to 70:1.

7. The wood adhesive of claim 1, wherein 80 wt % to 90 wt % of the wood adhesive has a particle size of less than 75 microns.

8. The wood adhesive of claim 1, wherein 60 wt % to 70 wt % of the wood adhesive has a particle size of less than 45 microns.

9. The wood adhesive of claim 1, wherein the wood adhesive has a cumulative formaldehyde to phenol mole ratio (F:P) of 2.1:1 to 2.6:1.

10. The wood adhesive of claim 1, wherein the aqueous phenol-formaldehyde resin has a total alkalinity of 3 to 6 percent by weight of the aqueous phenol-formaldehyde resin.

11. The wood adhesive of claim 1, wherein the source of calcium ions is calcium carbonate.

12. The wood adhesive of claim 1, wherein the source of calcium ions is calcium sulfate.

13. The wood adhesive of claim 1, wherein the source of calcium ions is calcium oxide.

14. The wood adhesive of claim 1, wherein the source of calcium ions is calcium chloride.

15. The wood adhesive of claim 1, wherein the alkaline reaction product has a Gardner-Holdt viscosity in the range of L to W.

16. The wood adhesive of claim 1, wherein the alkaline reaction product has a Gardner-Holdt viscosity of OP-PP at a solids content of 35 wt % to 55 wt %.

17. The wood adhesive of claim 1, wherein 80 wt % to 90 wt % of the wood adhesive has a particle size of less than 75 microns, wherein 60 wt % to 70 wt % of the wood adhesive has a particle size of less than 45 microns, and wherein the wood adhesive has a bulk density of about 0.54 grams per cubic centimeter to about 0.67 grams per cubic centimeter.

18. The wood adhesive of claim 1, wherein the alkaline reaction product of phenol and formaldehyde is prepared by:
reacting a first amount of formaldehyde with an aqueous solution of phenol and a source of calcium ions to prepare a phenol-formaldehyde oligomeric species having a formaldehyde to phenol molar ratio (F:P) of 0.6:1 to 1.6:1; and
reacting the phenol-formaldehyde oligomeric species with a second amount of formaldehyde to prepare the alkaline reaction product of phenol and formaldehyde.

19. The wood adhesive of claim 18, wherein the source of calcium ions comprises calcium sulfate or calcium chloride.

20. The wood adhesive of claim 1, wherein:
the cumulative formaldehyde to phenol molar ratio (F:P) is 2.1:1 to 2.6:1,
the alkaline reaction product has a Gardner-Holdt viscosity of OP-PP at a solids content of 35 wt % to 55 wt %,
the total alkalinity is 3 to 6 percent by weight of the aqueous phenol-formaldehyde resin,
the aqueous phenol-formaldehyde resin is prepared in the presence of calcium ions in an amount sufficient to provide a phenol to calcium molar ratio (P:Ca) of 40:1 to 60:1,
80 wt % to 90 wt % of the wood adhesive has a particle size of less than 75 microns,
60 wt % to 70 wt % of the wood adhesive has a particle size of less than 45 microns, and
the wood adhesive has a bulk density of about 0.54 grams per cubic centimeter to about 0.67 grams per cubic centimeter.

* * * * *